(12) United States Patent
Sozer et al.

(10) Patent No.: US 11,233,445 B2
(45) Date of Patent: Jan. 25, 2022

(54) ACOUSTIC NOISE MITIGATION SYSTEM FOR AN ELECTRIC MACHINE

(71) Applicants: Yilmaz Sozer, Stow, OH (US); Yusuf Yasa, Osmangazi-Bursa (TR)

(72) Inventors: Yilmaz Sozer, Stow, OH (US); Yusuf Yasa, Osmangazi-Bursa (TR)

(73) Assignee: THE UNIVERSITY OF AKRON, Akron, OH (US)

( * ) Notice: Subject to any disclaimer, the term of this patent is extended or adjusted under 35 U.S.C. 154(b) by 187 days.

(21) Appl. No.: 16/599,349

(22) Filed: Oct. 11, 2019

(65) Prior Publication Data

US 2020/0119631 A1    Apr. 16, 2020

Related U.S. Application Data

(60) Provisional application No. 62/744,333, filed on Oct. 11, 2018.

(51) Int. Cl.
| | |
|---|---|
| *H02K 5/24* | (2006.01) |
| *H02K 37/22* | (2006.01) |
| *H02K 37/04* | (2006.01) |

(52) U.S. Cl.
CPC ............. *H02K 37/22* (2013.01); *H02K 37/04* (2013.01)

(58) Field of Classification Search
CPC .................................. H02K 5/24; H02K 37/22
See application file for complete search history.

(56) References Cited

U.S. PATENT DOCUMENTS

| 5,873,710 A | * | 2/1999 | Tucker | ................... H02K 1/185 417/410.5 |
| 6,144,137 A | * | 11/2000 | Engelbert | ............ B62D 5/0403 310/410 |
| 2021/0013752 A1 | * | 1/2021 | Futae | ....................... H02K 5/24 |

* cited by examiner

*Primary Examiner* — Ramon M Barrera
(74) *Attorney, Agent, or Firm* — Renner Kenner Greive Bobak Taylor & Weber

(57) ABSTRACT

An acoustic noise mitigation system for an electric machine includes one or more suspension members. The suspension members may include arcuate members that are positioned between a machine housing and a stator. During operation of the electric machine, the electromagnetic force frequency that is generated by the stator relative to a rotating rotor is able to be absorbed by the suspension members. As a result, acoustic noise generated by the electric machine is reduced.

14 Claims, 12 Drawing Sheets

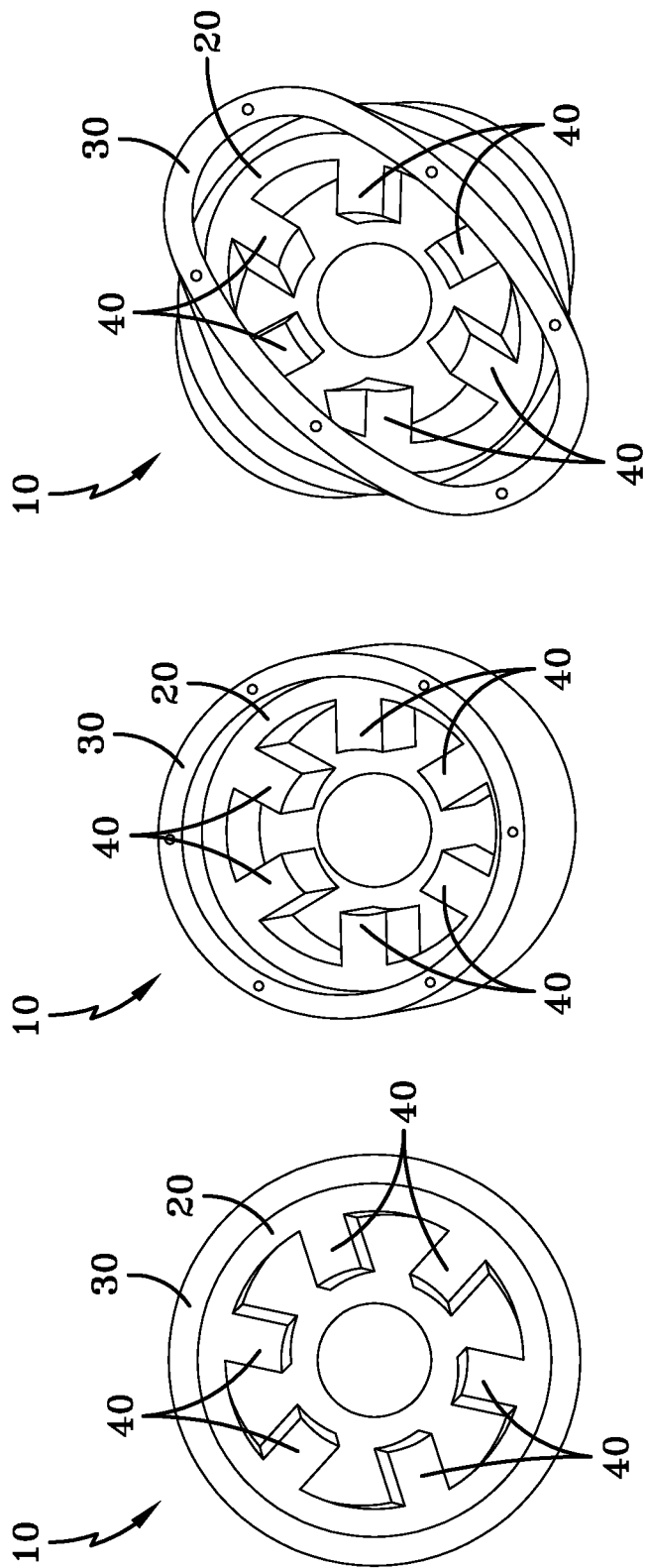

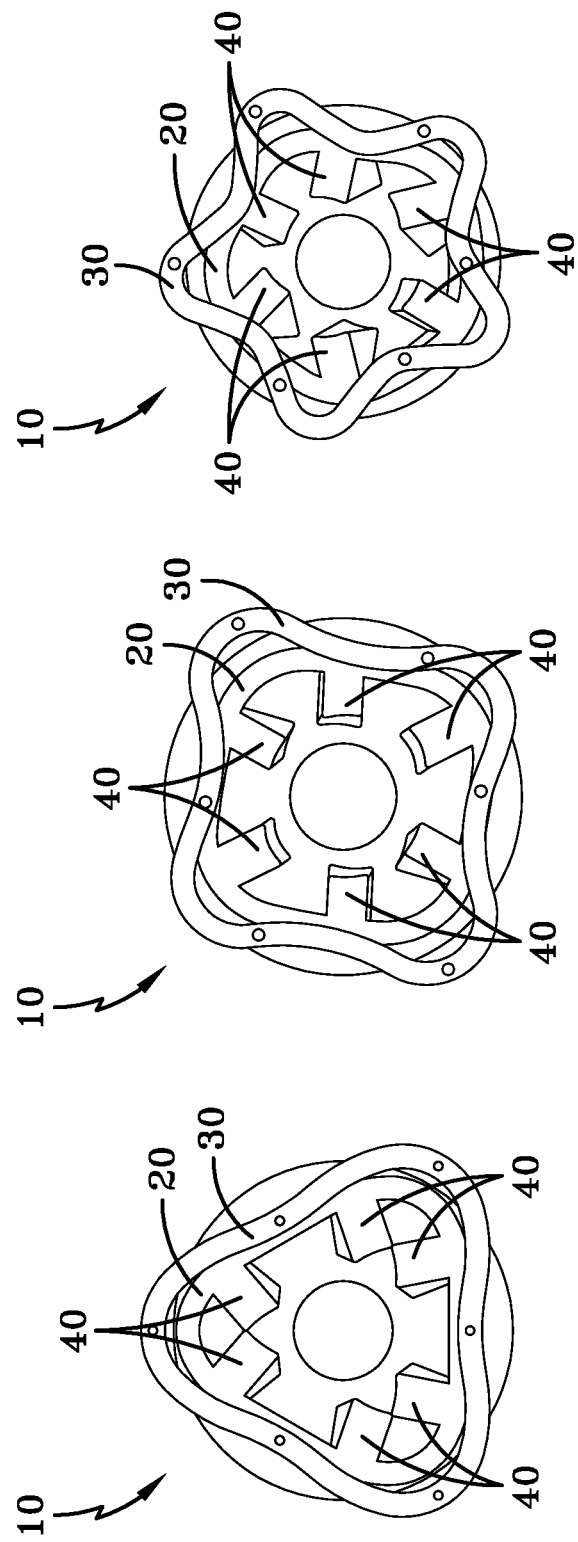

ACOUSTIC NOISE MITIGATION SYSTEM FOR AN ELECTRIC MACHINE

CROSS-REFERENCE TO RELATED APPLICATION

This application claims the benefit of U.S. Provisional Application No. 62/744,333 filed Oct. 11, 2018 the contents of which are incorporated herein by reference.

TECHNICAL FIELD

The various embodiments disclosed herein relate to electric machines. In particular, the various embodiments disclosed herein relate to acoustic noise mitigation systems for electric machines. More particularly, the various embodiments disclosed herein relate to acoustic noise mitigation systems for electric machines, whereby a stator is suspended in a housing by one or more suspension units.

BACKGROUND

The acoustic noise generated by electric machines 10 (rotor removed), which are capable of being operated as electric motors or electric generators, is primarily due to the high deformation level that is experienced by a stator 20 and a frame or housing 30 that carries the stator, as shown in FIG. 1. The surface deformation of the stator 20 occurs because of radial forces that are created by the electromagnetic field generated on the stator poles or teeth 40 during operation of the machine 10.

Furthermore, objects have their own natural frequencies, which can cause the object to react with a high sensitivity response. When an applied force frequency that is placed on the object coincides with any of these natural frequencies, resonance will occur. In resonance, the acoustic noise level rises dramatically. Furthermore, an object has several natural frequencies and mode shapes over a given frequency range. For example, FIGS. 2A-F show 6 typical natural frequency mode shapes that are generated by the operation of the machine 10, which are denoted respectively as Mode-0, Mode-1, Mode-2, Mode-3, Mode-4, and Mode-5. Thus, whenever any of these mode shape frequencies is excited by the applied force, the electric machine 10 will vibrate with the related mode shape, and a resultant acoustic noise is generated.

Therefore, there is a need for a noise mitigation system for an electric machine that includes a suspension system capable of absorbing applied forces that are generated from the radial forces of the stator.

SUMMARY

It is a first aspect of the various embodiments disclosed herein to provide an electric machine including a housing, a stator, a rotor rotatable relative to the stator, and a plurality of spaced suspension units that suspend the stator within the housing.

It is another aspect of the various embodiments disclosed herein to provide an electric machine housing including a housing, a stator, and a plurality of spaced suspension units that suspend the stator within the housing.

BRIEF DESCRIPTION OF THE DRAWINGS

These and other features and advantages of the various embodiments disclosed herein will become better understood with regard to the following description, appended claims, and accompanying drawings, wherein:

FIG. 2A is a top plan view of a conventional electric machine shown in FIG. 1 in frequency Mode-0 in accordance with the concepts of the various embodiments disclosed herein;

FIG. 2B is a top plan view of a conventional electric machine shown in FIG. 1 in frequency Mode-1 in accordance with the concepts of the various embodiments disclosed herein;

FIG. 2C is a top plan view of a conventional electric machine shown in FIG. 1 in frequency Mode-2 in accordance with the concepts of the various embodiments disclosed herein;

FIG. 2D is a top plan view of a conventional electric machine shown in FIG. 1 in frequency Mode-3 in accordance with the concepts of the various embodiments disclosed herein;

FIG. 2E is a top plan view of a conventional electric machine shown in FIG. 1 in frequency Mode-4 in accordance with the concepts of the various embodiments disclosed herein;

FIG. 2F is a top plan view of a conventional electric machine shown in FIG. 1 in frequency Mode-5 in accordance with the concepts of the various embodiments disclosed herein;

DETAILED DESCRIPTION

Figure 1:
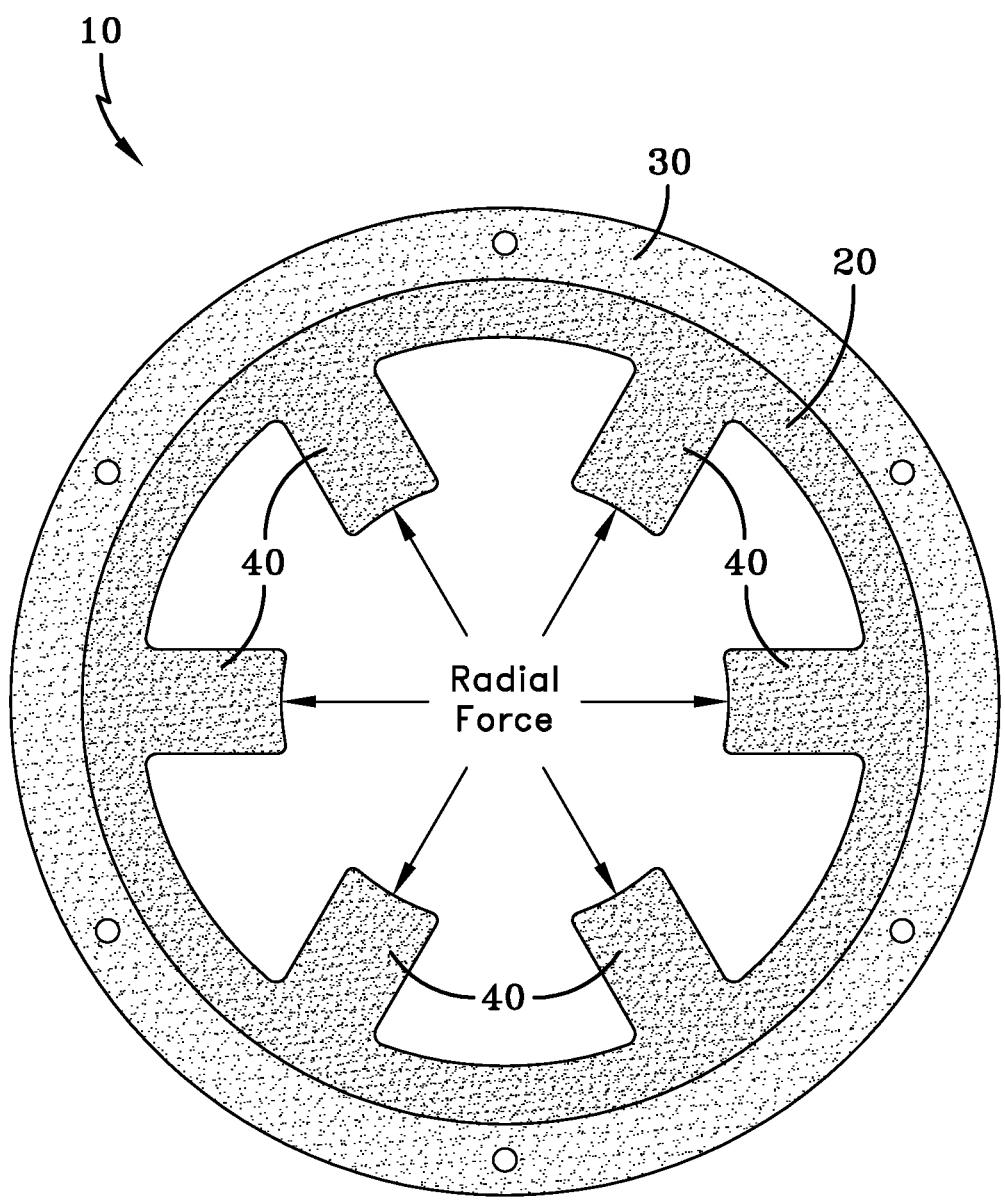
FIG. 1 is a top plan view of a conventional electric machine housing in accordance with the concepts of the various embodiments disclosed herein.
Figure 3:
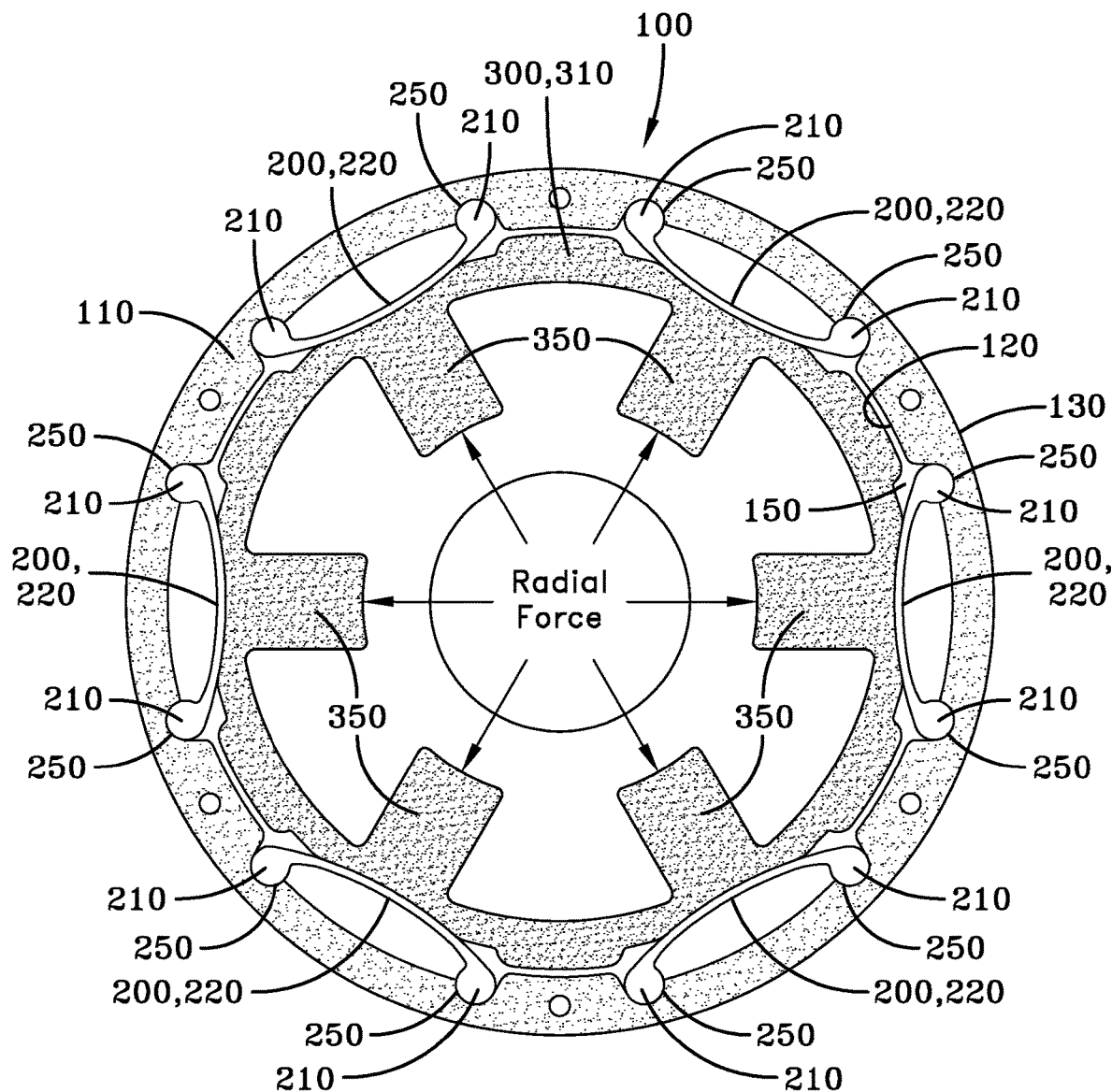
FIG. 3 is a top plan view of an acoustic noise mitigation system for an electric machine in accordance with the concepts of the various embodiments disclosed herein.

An electric machine 100 having an acoustic noise mitigation system in accordance with the various embodiments disclosed herein is shown in FIGS. 3-7. The electric machine 100, which is capable of operating as either an electric motor or as an electric generator, includes a housing or frame 110, which may be formed from any suitable material, such as metal, ceramic, composite material, polymeric material, or combinations thereof. In some embodiments, the housing 110 may be cylindrical in shape, but may be any other suitable shape, including rectilinear, curvilinear or a combination thereof. The housing 110 includes opposed inner and outer surfaces 120 and 130. The housing 110 forms a cavity 150 bounded by the inner surface 120, which in some embodiments is cylindrical, but may be any suitable shape.

One or more suspension units 200 are attached to the inner surface 120 of the housing 110. In such embodiments, a plurality of suspension units 200 may be arranged at spaced intervals about the inner surface 120. In some embodiments, each suspension unit 200 includes a pair of spaced legs 210 that are joined by an arcuate or curved suspension member 220. The arcuate or curved member 220 may be elongated in some embodiments. For example, in some embodiments, the suspension units 200 may extend the full length of the housing 110 or may have a length that is less than the full length of the housing 110. The suspension units 200, particularly, the arcuate member 220, may be formed of any suitable material, including but not limited to: metal, alloys, polymers steel, steel alloys, chrome silicon, carbon steel, cobalt nickel, nickel-based alloy, titanium alloys, aluminum alloys, carbon fibers, polymeric materials, and the like.

It should be appreciated that in some embodiments, the suspension units 200 may comprise resilient material, such a polymeric material and disposed between the housing 110 and the stator 300, so as to suspend the stator 300 within the housing 110, and so as to space the stator 300 from the inner surface 120 of the housing 110.

The legs 210 of the suspension units may be received within counterpart recesses 250 that are disposed in the inner surface 120 of the housing 110 to retain the suspension units 200. For example, the legs 210 may comprise a partially annular cross-section that is configured or "keyed" to be received within the compatible counterpart recesses 250 in the housing 110. Alternatively, the suspension units 200 may be attached to the inner surface of the housing 110 using any suitable means of fixation, such as adhesive, rivets, friction fit, and the like. The suspension units 200 have opposed concave and convex surfaces 260 and 270. As such, the suspension units 200 are spaced about the inner surface 120 of the housing 110, such that the convex surface 270 is proximate to a stator 300 and the concave surface 260 is proximate to the inner surface 120 of the housing or frame 110. In other words, the suspension units 200 are radially spaced about the cylindrical inner surface 120 of the housing 110.

It should be appreciated that in some embodiments, the suspension units 200 may include only a single leg from which extends the arcuate suspension member 220. As such, only the single leg is attached to the inner surface 120 of the housing 110, while leaving the free edge of the arcuate suspension unit 200 spaced from the inner surface 120 of the housing 110 and free to move or deflect.

Suspended by the suspension units 200 within housing cavity 150 is the stator 300. The stator 300 includes a body or core 310 that is formed from any suitable ferromagnetic material, including but not limited to various combinations of silicon, nickel, iron, steel, or other ferromagnetic materials in laminated structures, or soft magnetic composites (SMC) can be used for the stator 300 and the rotor 500. configurations. Depending on the electric machine structure rotor could have permanent magnet material or not.

The stator body 300 includes a substantially cylindrical shape having opposed inner and outer surfaces 310 and 312. Extending from the inner surface 310 of the stator 300 is a plurality of teeth 350. The stator 300 is positioned within the housing cavity 150 such that the outer surface 312 of the stator 300 is contact with the suspension units 200 to suspend the stator 300 within the housing 110. For example, in the case of the suspension member 220, the convex 270 surface of the suspension member 220 is in contacted with the stator 300. As such, the outer surface 312 of the stator body 310 is spaced apart from the inner surface 120 of the housing 110 by a gap 400. Accordingly, the stator 300 is frictionally engaged with the convex surface 270 of the suspension members 200, and as such, is suspended within the housing 110. It should be appreciated that due to the arcuate shape of the suspension member 220 that the suspension member 220 is spaced away from the inner surface 120 of the housing 110 by a gap 360. As such, as the stator 300 begins to deform due to electromagnetic forces applied to the stator teeth 350 by the operation of the machine 100, the suspension members 220 are capable of also deflecting, so as to absorb the energy generated from the deformation forces of the stator 300.

A rotor 500 is rotatably poisoned within an opening defined by the stator teeth 350. The rotating movement of the rotor 500 is controlled by applying suitable control signals delivered to a suitable control system to the windings 510, which are associated with each of the stator teeth 350.

Accordingly, the machine 100 is configured such that if a force that is created by the electromagnetic field in an airgap between the stator teeth 350 and the rotor 500 is suspended, the surface deformation of the stator 300 and the frame or housing 110 is reduced. As a result, the vibration and the acoustic noise generated by the electric machine 100 are reduced.

As previously discussed, the electric machine 100 can be operated as an electric motor or as an electric generator. Furthermore, the suspension units 200 are applicable for various types and configurations of electric machines, including but not limited to permanent magnet electric machines, surface mount or interior mount permanent magnet electric machines, switched reluctance electric machines, variable flux switching machines, stepper electric machines, induction machines, DC brushed or brushless electric machines, and the like. The electric machine 100 may have any suitable number of poles for the stator and the rotor, which are different than that shown or discussed herein. The windings provided by the electric machine 100 may be configured in various ways, including but not limited to: distributed winding, concentrated winding, fractional or full pitch winding configurations, and the like.

The suspension units 200 are compatible for use in both radial and axial flux electric machines. For radial flux machines, the suspension units 200 are placed in the radial direction to eliminate the radial vibration. For the axial flux machines, the suspension units 200 are placed in the axial direction to eliminate axial vibration.

Experimental Section

Figure 8:
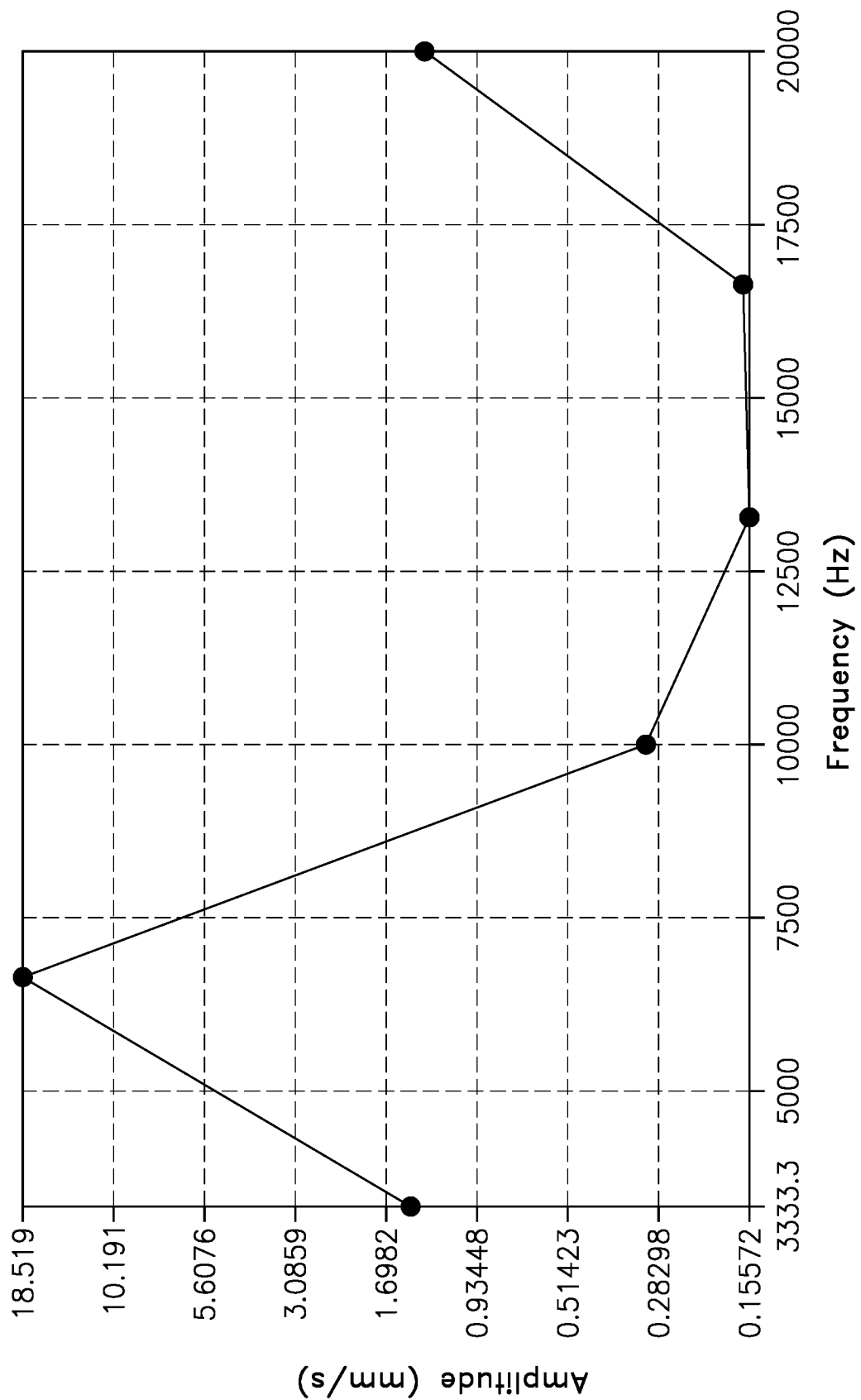
FIG. 8 is a graph showing electric machine housing surface deformation velocity of a conventional electric machine.
Figure 9:
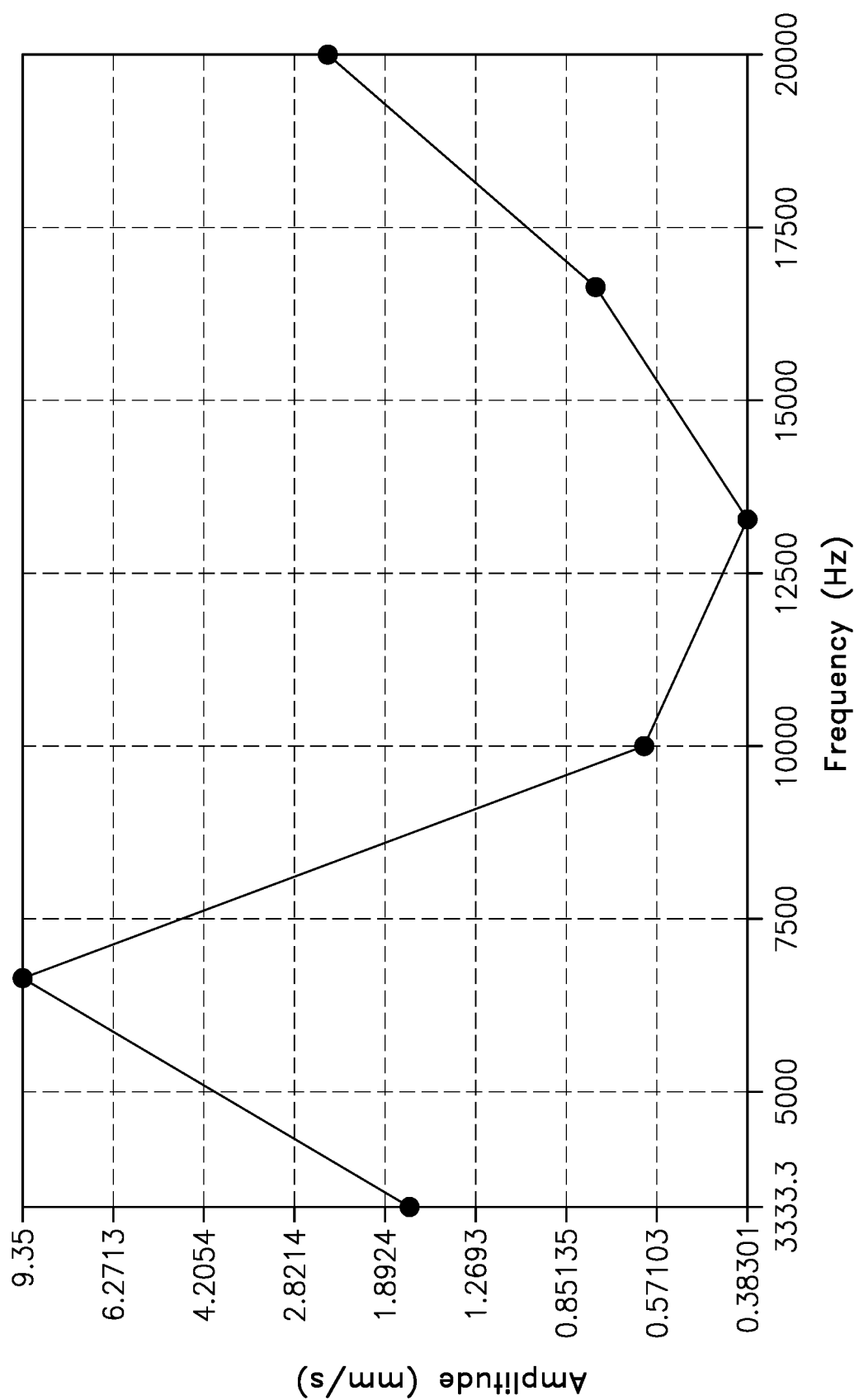
FIG. 9 is a graph showing electric machine housing surface deformation for the acoustic noise mitigation system disclosed herein in accordance with the concepts of the various embodiments disclosed herein.
Figure 10:
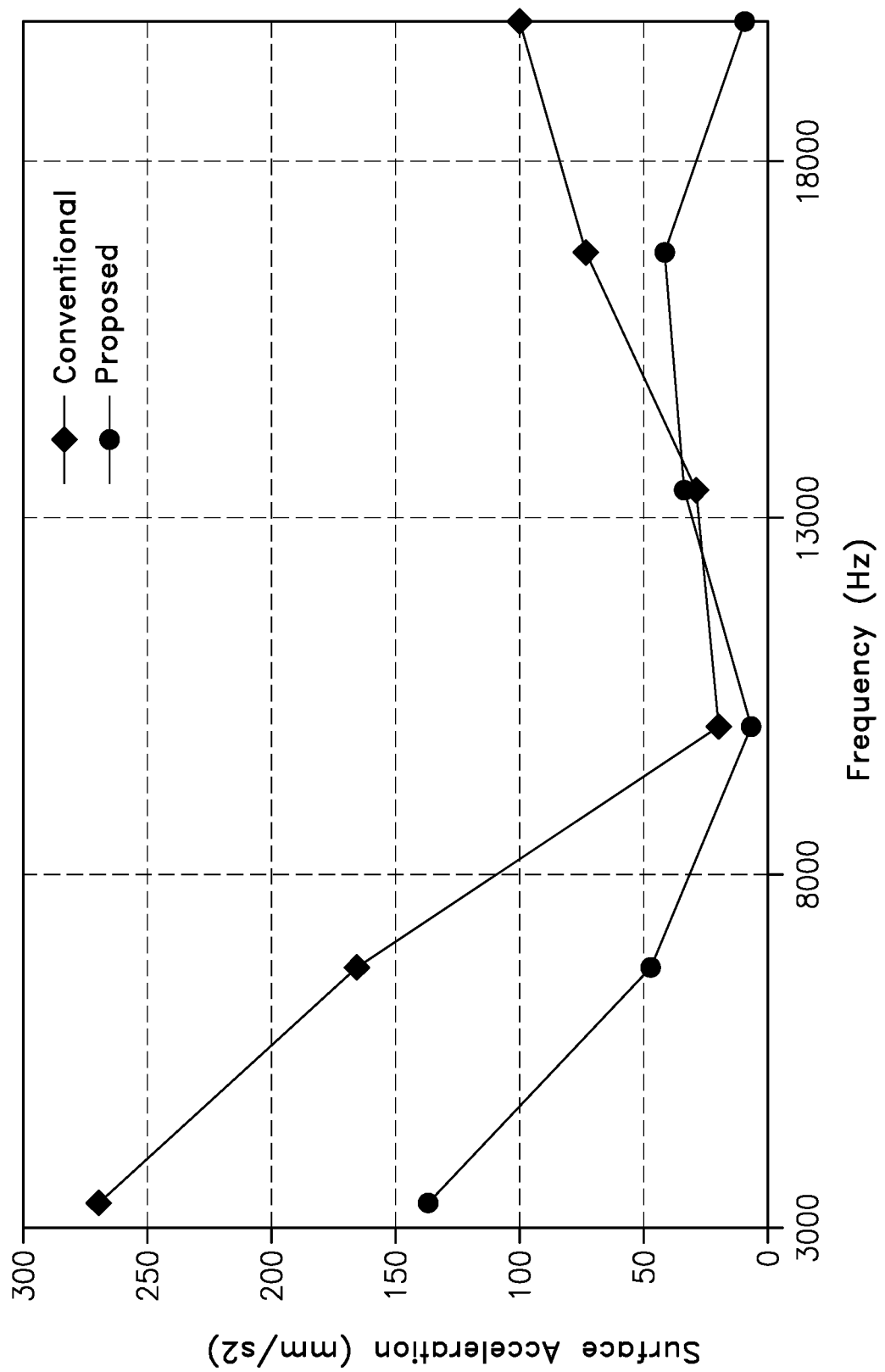
FIG. 10 is a graph showing a conventional electric machine and the acoustic noise mitigation system for an electric machine as disclosed herein with respect to electric machine housing surface deformation acceleration.

FIGS. 8 and 9 show the electric machine frame/housing surface deformation velocities through different excitational frequencies for a conventional electric machine without one more suspension units (FIG. 8) and the electric machine 100 (FIG. 9) using suspension units 200, which comprise suspension members 220. From the results, it is evident that the suspension members 220 which are inserted between the stator 300 and the frame/housing 110 have a suppressive effect on surface deformation velocity, especially at low frequencies. In terms of acoustic noise, low-frequency harmonic components have a bigger effect than higher frequencies. As the suspension members 220 suppress the low frequencies, the total generated acoustic noise from the machine 100 is much lower than a conventional electric machine of the same size. To demonstrate this effect, the simulation results for one sample condition are presented below. The highest harmonic component of the conventional machine surface velocity which exists at 3.3 kHz has 18.5 mm/s is reduced to the 9.35 mm/s level. Moreover, the beneficial effect of the suspension members 220 is evident from the acceleration as well. A comparison of the conventional machine and the machine 100 in terms of acceleration is shown in FIG. 10.

Figure 4:
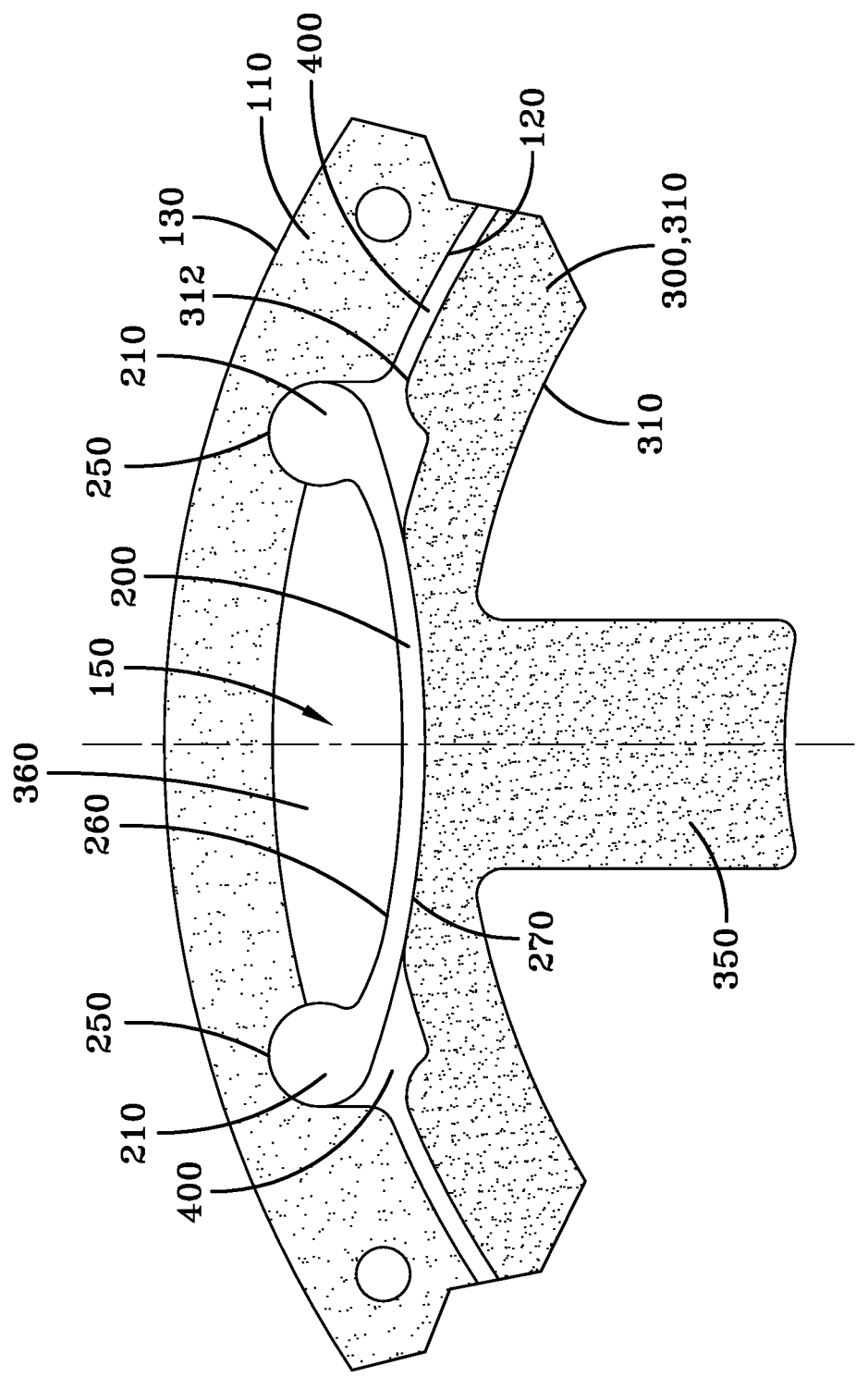
FIG. 4 is another view of the acoustic noise mitigation system for an electric machine in accordance with the concepts of the various embodiments disclosed herein.
Figure 5:
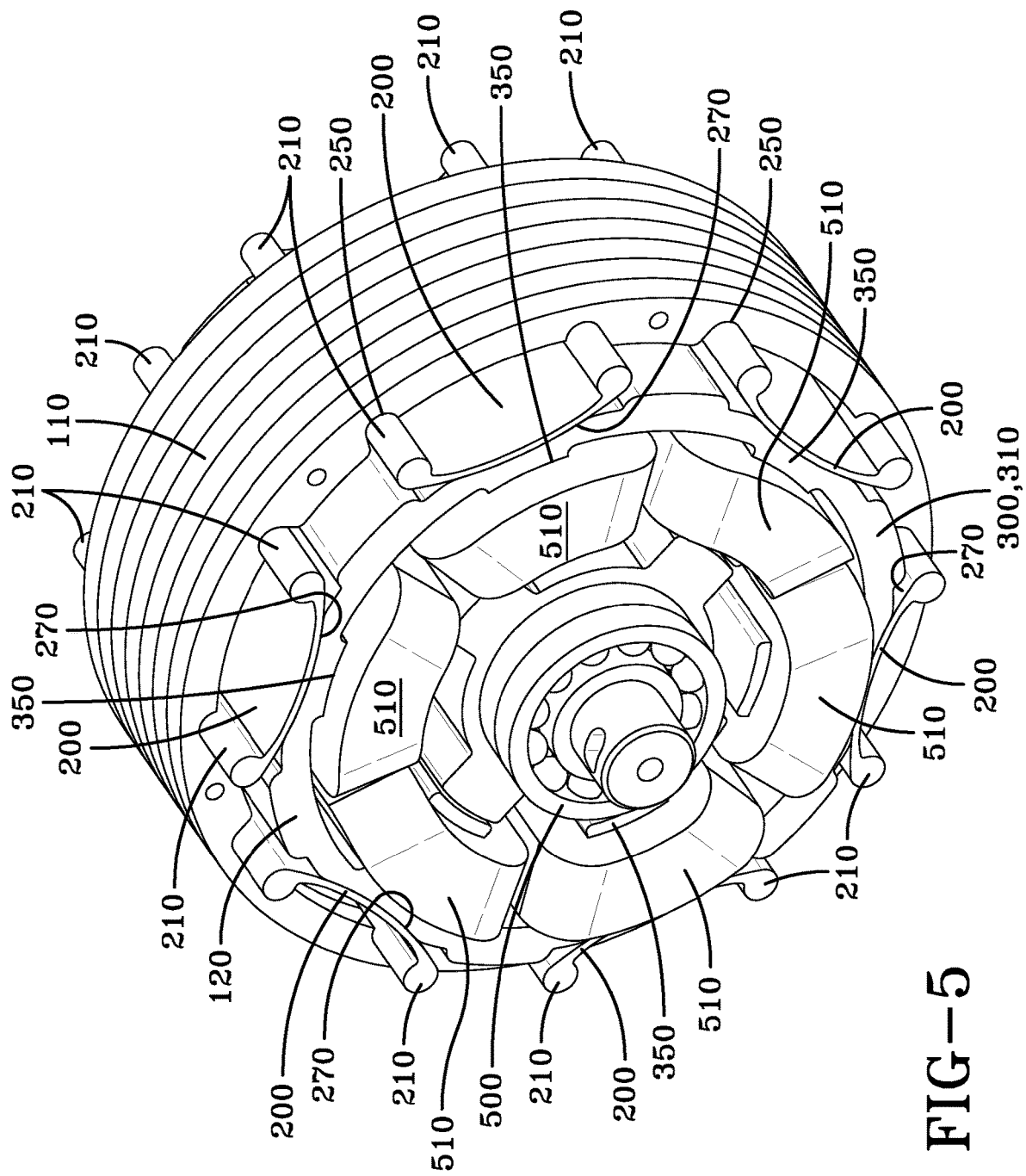
FIG. 5 is another perspective view of the acoustic noise mitigation system for an electric machine in accordance with the concepts of the various embodiments disclosed herein.
Figure 6:
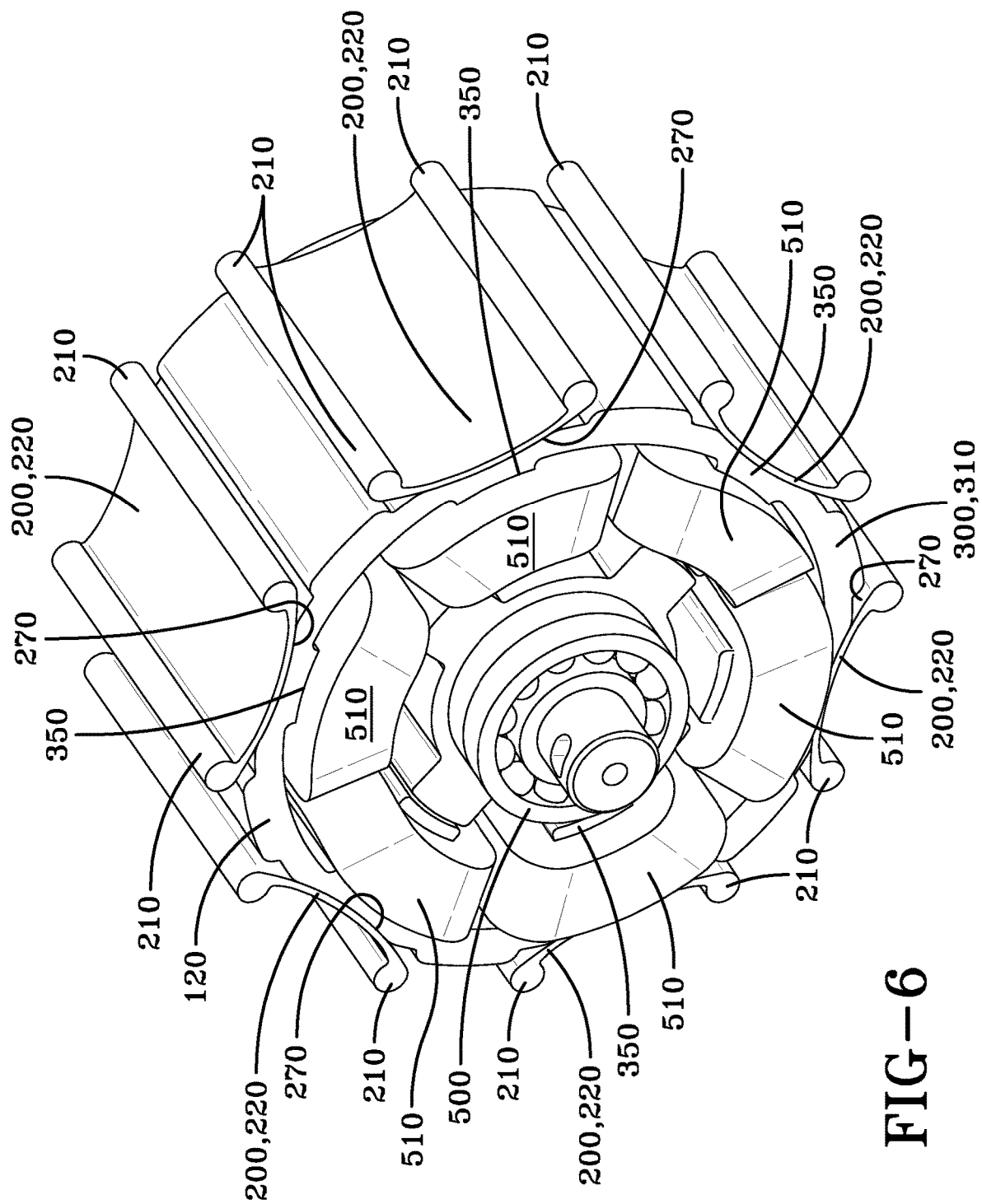
FIG. 6 is another perspective view of the acoustic noise mitigation system for an electric machine in accordance with the concepts of the various embodiments disclosed herein.
Figure 7:
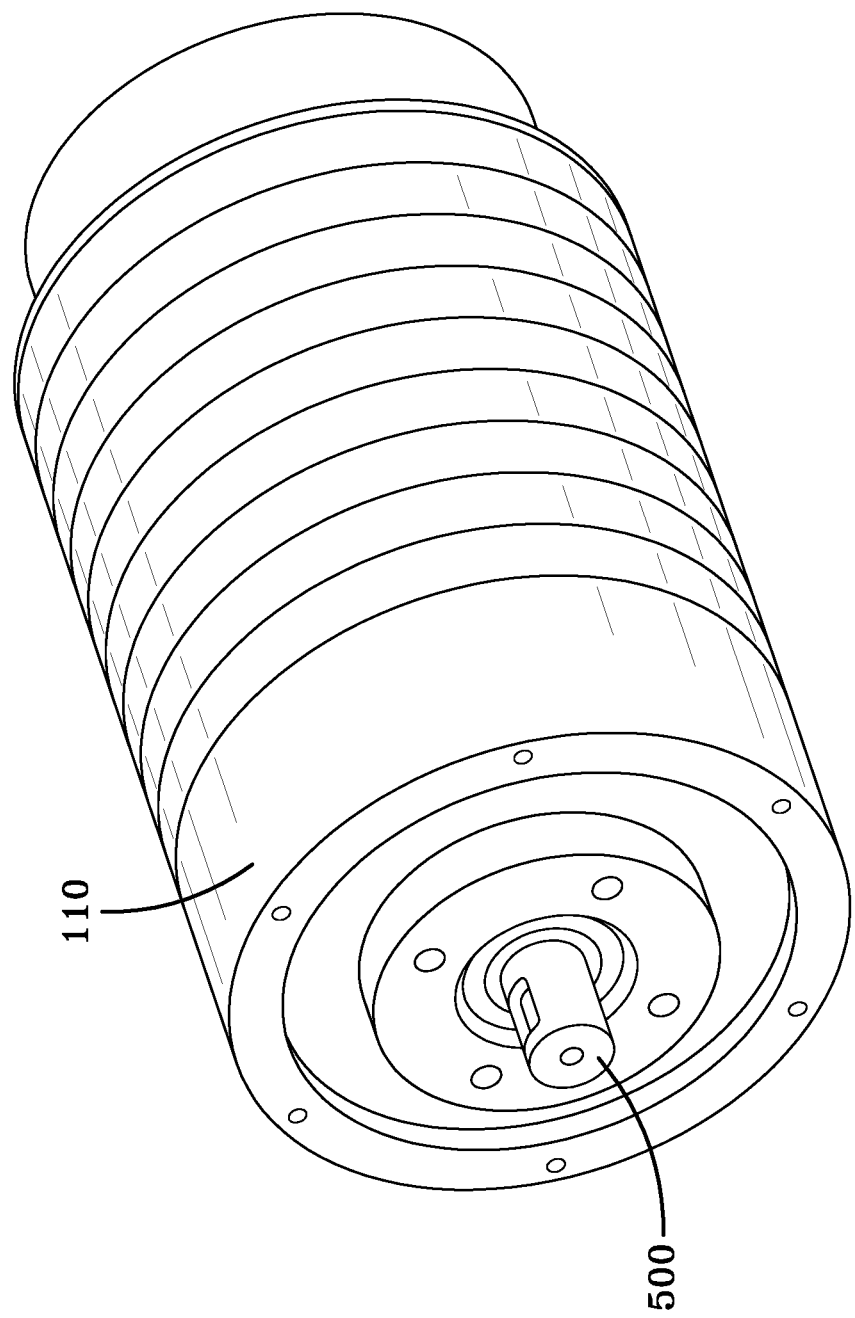
FIG. 7 is another perspective view of the acoustic noise mitigation system for an electric machine in accordance with the concepts of the various embodiments disclosed herein.
Figure 11:
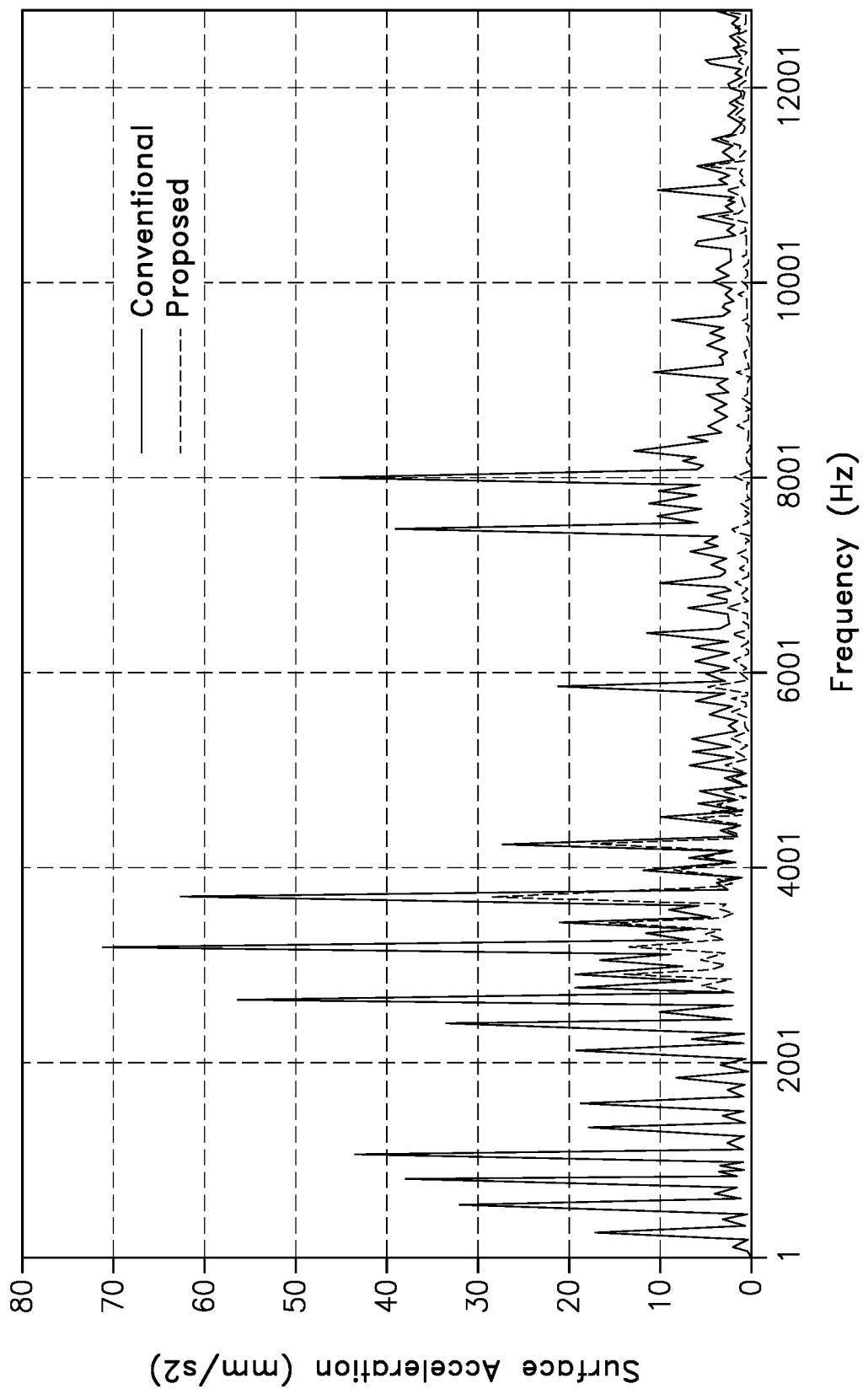
FIG. 11 is a graph showing experimental results of a conventional electric machine and the acoustic noise mitigation system for an electric machine as disclosed herein with respect to electric machine housing surface deformation acceleration.

Experimental evaluation was also performed to verify the effectiveness of the suspension members 220 on the acoustic noise mitigation. The suspension members 220 in some embodiments are produced from the spring metals which have high stiffness compared to the other raw materials. Suspension members 220 were prototyped using a CNC (computerized numerically controlled) machine with very high tolerances, which were inserted between the stator lamination 300 and the frame/housing 110, as shown in FIG. 4. The surface acceleration was measured via an accelerometer by placing it on the frame/housing 110 surface behind the suspension member 220. The experimental results obtained for the conventional machine and machine 100 are compared in FIG. 11. Accordingly, the machine 100 reduces the acceleration values, which means that it reduces the acoustic noise of the electric machine 100.

What is claimed is:

1. An electric machine comprising:
a housing;
a stator;
a rotor rotatable relative to said stator; and
a plurality of spaced suspension units that suspend said stator within said housing,
wherein each one of said plurality of spaced suspension units comprise a respective arcuate member such that the electric machine includes a plurality of said respective arcuate members,
wherein each respective arcuate member includes a first leg and a second leg that are separated by said respective arcuate member, with said first leg and said second leg being in contact with said housing and said respective arcuate member being in contact with said stator, and
wherein each one of said plurality of spaced suspension units is associated with a respective stator tooth provided by said stator such that said first leg and said second leg are associated with said respective stator tooth.

2. The electric machine of claim 1, wherein said arcuate member has a convex surface that is in contact with said stator.

3. The electric machine of claim 1, wherein said arcuate member is formed of steel, steel alloys, chrome silicon, carbon steel, cobalt nickel, nickel based alloy, titanium alloys, aluminum alloys, carbon fibers, polymeric materials, or combinations thereof.

4. The electric machine of claim 1, wherein said plurality of spaced suspension units are radially arranged.

5. The electric machine of claim 1, wherein said plurality of spaced suspension units comprise a polymeric material.

6. An electric machine comprising:
a housing;
a stator;
a rotor rotatable relative to said stator; and
a plurality of spaced suspension units that suspend said stator within said housing,
wherein each one of said plurality of spaced suspension units comprise a respective arcuate member such that the electric machine includes a plurality of said respective arcuate members,
wherein each respective arcuate member includes a first leg and a second leg that are separated by said respective arcuate member, with said first and second legs being in contact with said housing and said respective arcuate member being in contact with said stator,
wherein said first leg and said second leg are received within respective recesses in said housing.

7. The electric machine of claim 6, said stator having a length, wherein said plurality of said respective arcuate members extends the length of said stator.

8. An electric machine housing comprising:
a housing;
a stator; and
a plurality of spaced suspension units that suspend said stator within said housing,
wherein each one of said plurality of spaced suspension units comprise a respective arcuate member such that the electric machine includes a plurality of said respective arcuate members, and
wherein each respective arcuate member includes a first leg and a second leg that are separated by said respective arcuate member, with said first leg and said second leg being in contact with said housing and said respective arcuate member being in contact with said stator, and
wherein each one of said plurality of spaced suspension units is associated with a respective stator tooth provided by said stator such that said first leg and said second leg are associated with said respective stator tooth.

9. The electric machine housing of claim 8, wherein said arcuate member has a convex surface that is in contact with said stator.

10. The electric machine housing of claim 8, wherein said arcuate member is formed of steel, steel alloys, chrome silicon, carbon steel, cobalt nickel, nickel based alloys, titanium alloys, aluminum alloys, carbon fibers, polymeric materials, or combinations thereof.

11. The electric machine housing of claim 8, wherein said plurality of spaced suspension units are radially arranged.

12. The electric machine housing of claim 8, wherein said plurality of spaced suspension units comprise a polymeric material.

13. An electric machine housing comprising:
a housing;
a stator; and
a plurality of spaced suspension units that suspend said stator within said housing,
wherein each one of said plurality of spaced suspension units comprise a respective arcuate member such that the electric machine housing includes a plurality of said respective arcuate members,
wherein each respective arcuate member includes a first leg and a second leg that are separated by said respective arcuate member, with said first and second legs being in contact with said housing and said respective arcuate member being in contact with said stator, wherein said first leg and said second leg are received within respective recesses in said housing.

14. An electric machine housing comprising:

a housing;

a stator having a length; and a plurality of spaced suspension units that suspend said stator within said housing, wherein each one of said plurality of spaced suspension units comprise a respective arcuate member such that the electric machine housing includes a plurality of said respective arcuate members, wherein each respective arcuate member includes a first leg and a second leg that are separated by said respective arcuate member, with said first and second legs being in contact with said housing and said respective arcuate member being in contact with said stator, and wherein said plurality of said respective arcuate members extends the length of said stator.

* * * * *